(12) United States Patent
Wheeler

(10) Patent No.: US 7,204,679 B2
(45) Date of Patent: Apr. 17, 2007

(54) FLOW CONTROL SYSTEM

(75) Inventor: Matthew G. Wheeler, Hood River, OR (US)

(73) Assignee: Emerson Electric Co., St. Louis, MO (US)

( * ) Notice: Subject to any disclaimer, the term of this patent is extended or adjusted under 35 U.S.C. 154(b) by 866 days.

(21) Appl. No.: 10/065,275

(22) Filed: Sep. 30, 2002

(65) Prior Publication Data

US 2004/0060607 A1 Apr. 1, 2004

(51) Int. Cl.
*F04B 9/08* (2006.01)
*H01L 21/461* (2006.01)

(52) U.S. Cl. .................. 417/390; 438/692; 438/693

(58) Field of Classification Search ........... 417/383, 417/385, 386, 387, 390
See application file for complete search history.

(56) References Cited

U.S. PATENT DOCUMENTS

| | | | |
|---|---|---|---|
| 3,635,607 A | | 1/1972 | Grise |
| 3,756,456 A | | 9/1973 | Georgi |
| 4,488,853 A | * | 12/1984 | Benson .................. 417/240 |
| 4,863,066 A | | 9/1989 | Uffenhiemer et al. |
| 4,950,134 A | * | 8/1990 | Bailey et al. ............. 417/383 |
| 5,056,036 A | | 10/1991 | Van Bork |
| 5,443,180 A | | 8/1995 | Dussau |
| 5,753,515 A | | 5/1998 | Benzing et al. |
| 5,971,722 A | | 10/1999 | Maget et al. |
| 6,107,203 A | * | 8/2000 | Vanell .................. 438/692 |
| 6,109,881 A | * | 8/2000 | Snodgrass et al. ........ 417/53 |
| 6,149,508 A | * | 11/2000 | Vanell et al. ............. 451/72 |
| 6,254,453 B1 | * | 7/2001 | Li et al. .................. 451/8 |

FOREIGN PATENT DOCUMENTS

| | | |
|---|---|---|
| FR | 945469 A | 5/1949 |
| RU | 2062991 | 6/1996 |
| SU | 97285 A | 9/1952 |
| SU | 125162 A | 11/1960 |
| SU | 591609 A | 1/1978 |
| SU | 723215 A | 5/1980 |
| SU | 767528 A | 9/1980 |
| WO | 9823932 A | 6/1998 |

OTHER PUBLICATIONS

International Search Report for International Patent PCT/US 03/28397, Feb. 25, 2004.
Official Action, Russian Patent Office for Russian Patent Application No. 2005113299, Dec. 30, 2005.
Chemical Dispensing Pump, Service Filtration of Canada Ltd., www.service-filtration.com, date unknown.
High Precision Fluid Dispensing Pump, Model P4000, www.semicontechpro.8m.com, date unknown.

* cited by examiner

*Primary Examiner*—Charles G. Freay
(74) *Attorney, Agent, or Firm*—Locke Liddell & Sapp LLP

(57) ABSTRACT

A flow control system includes a substantially rigid vessel with a process fluid reservoir situated in the rigid vessel is in fluid communication with an outlet. A movable member and/or a working fluid is situated in the rigid vessel so as to selectively expel process fluid from the outlet. Where a movable member is employed, movement of the movable member in a first direction causes process fluid to be drawn into an inlet and movement of the movable member in a second direction causes process fluid to be expelled from the outlet. In other implementations, the working fluid is metered into a working fluid reservoir to compress a flexible process fluid reservoir and expel process fluid therefrom.

8 Claims, 2 Drawing Sheets

FLOW CONTROL SYSTEM

BACKGROUND OF INVENTION

1. Field of the Invention

The present invention relates generally to fluid flow and control, and more particularly, to a fluid flow control system suitable for use in ultra-pure or corrosive applications.

2. Description of Related Art

Many industries such as semiconductor, pharmaceutical, and bio-technology experience fluid delivery problems due to typically low flow rates, the use of abrasive chemical fluids, the use of corrosive chemical fluids, and the need for contaminant free, accurate, compact, and real-time fluid delivery and/or blending systems.

For example, Chemical-Mechanical Planarization (CMP) is a critical process in the semiconductor industry that involves a process to flatten the wafer surface of a semiconductor. In most applications, a slurry-coated polishing pad rotates at a controlled speed against the semiconductor wafer to flatten the surface. The slurry contains chemicals that soften the surface chemically as well as abrasives that work with the polishing pad to mechanically polish the surface. For CMP to work perfectly, the mechanical and chemical polishing must work together in a delicate balance any changes to this balance can cause damage to the wafer or reduce yield. If there is no slurry, then all of the polishing is mechanical and it would be like polishing glass with sandpaper. If there is too much slurry, most of the polishing is chemical and again the balance is off. The polishing rate of the wafer is highly dependent upon the delivery rate of the fluid and the total amount of fluid delivered during a polishing operation.

For processes such as CMP, the slurry delivery system typically includes a positive displacement pump, such as a peristaltic pump, to draw the slurry from a vessel and apply it to the polishing pad. The pump moves the fluid at a more or less constant rate depending on the speed of the pump, though the peristaltic pumping action causes a pulsation in the fluid delivery rate. Since the peristaltic pump is a volumetric fluid delivery system, the amount of fluid varies with changing conditions such as the pump tube age, the pump tube temperature, the fluid composition, the pump motor speed, the level of fluid in the vessel, pump calibration, etc.

Moreover, in many CMP and similar processes, fluid such as slurry is supplied in a circulating overhead loop. Such slurry loops are often driven with an air actuated diaphragm pump. Several CMP tools may be driven from the same loop. Pressure in the loop my change when one tool draws slurry. This change in loop pressure may affect the slurry flow rate on another tool connected to the same loop.

All of these influences on process flow rate are believed to reduce wafer yield in CMP processes. Therefore, there is a need for fluid delivery system that addresses shortcomings associated with the prior art.

SUMMARY OF INVENTION

In one aspect of the present invention, a flow control system includes a substantially rigid vessel that has an inlet and an outlet. A process fluid reservoir is situated in the rigid vessel and is in fluid communication with the inlet and the outlet. A movable member is positioned in the rigid vessel, such that movement of the movable member in a first direction causes process fluid to be drawn into the inlet and movement of the movable member in a second direction causes process fluid to be expelled from the outlet.

The process fluid reservoir may include a bladder situated in the rigid vessel in fluid communication with the inlet and the outlet. The inlet and the outlet may include inlet and outlet check valves, respectively, to control flow of the process fluid into and out of the process fluid reservoir.

In certain embodiments, a syringe pump is employed, and the rigid vessel thus comprises a cylinder with a plunger slidably positioned in the cylinder. A stepper motor, for example, actuates the plunger. In other embodiments, a diaphragm pump arrangement is used, wherein the movable member is a diaphragm that separates a drive fluid reservoir from the process fluid reservoir. A pump is in fluid communication with the working fluid reservoir to selectively meter working fluid into and out of the working fluid reservoir.

In accordance with further aspects of the present invention, a flow control system a substantially rigid vessel, with a process fluid outlet defined thereby. A flexible process fluid reservoir, for instance, a disposable bag, is situated in the rigid vessel and is in fluid communication with the process fluid outlet. A working fluid reservoir is situated in the rigid vessel and substantially surrounds the process fluid reservoir. The rigid vessel defines a working fluid inlet, such that working fluid received into the working fluid reservoir compresses the process fluid reservoir to expel process fluid therefrom through the process fluid outlet. A pump is connected to the working fluid inlet for metering working fluid into the working fluid reservoir.

In accordance with still further aspects of the present invention, a method of controlling the flow of slurry to a CMP tool includes providing a slurry reservoir containing slurry. The CMP tool is connected to a slurry outlet and the slurry reservoir is collapsed to expel slurry from the slurry reservoir to the CMP tool at a desired flow rate. The slurry may be provided in a disposable bag. Alternatively, a supply of slurry may be connected to a slurry inlet in fluid communication with the slurry reservoir. An inlet valve connected to the slurry inlet is opened, an outlet valve connected to the slurry outlet is closed and a predetermined volume of the slurry is drawn from the slurry supply into the slurry reservoir. Collapse the slurry reservoir then includes closing the inlet valve and opening the outlet valve to prevent slurry from being drawing into the slurry reservoir and allowing the slurry to be expelled to the CPM tool.

In certain exemplary embodiments, the slurry reservoir and a movable member are situated in a rigid vessel. Collapsing the slurry reservoir may be accomplished by moving the movable member in a first direction. A predetermined volume of the slurry is drawn from the slurry supply into the slurry reservoir by moving the movable member in a second direction. In other exemplary embodiments, the slurry reservoir is situated in a rigid vessel, and a working fluid is pumped into the rigid vessel to collapse the slurry reservoir.

BRIEF DESCRIPTION OF DRAWINGS

Other objects and advantages of the invention will become apparent upon reading the following detailed description and upon reference to the drawings in which.

Figure 1:
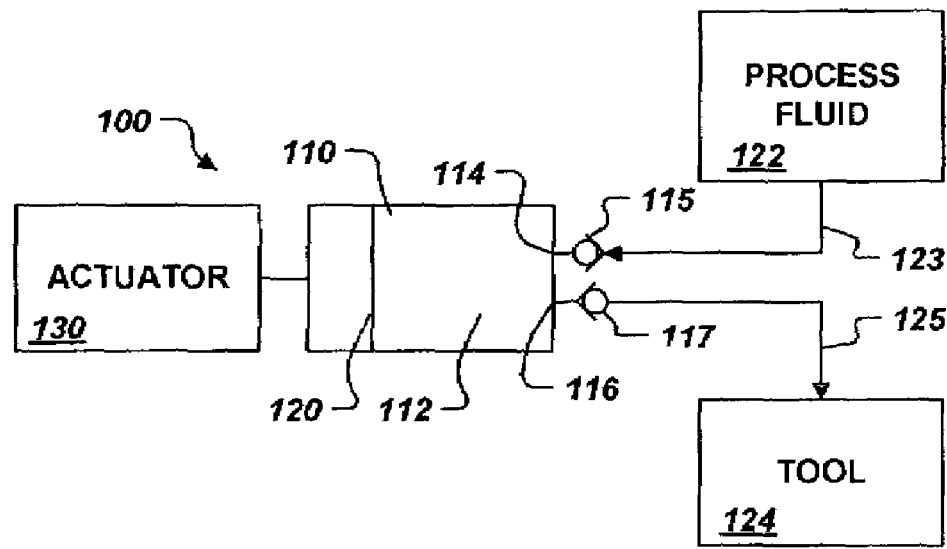
FIG. 1 is a block diagram conceptually illustrating a flow control system in accordance with aspects of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers" specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 is a block diagram conceptually illustrating portions of a flow control system 100 in accordance with aspects of the present invention. The exemplary pump system 100 shown in FIG. 1 includes a substantially rigid vessel 110 that includes an inlet 114 and an outlet 116 positioned generally at one side of the rigid vessel 110. A process fluid reservoir 112 is situated in the rigid vessel 110 in fluid communication with the inlet 114 and the outlet 116. To expel process fluid from the process fluid reservoir 110, the process fluid reservoir is collapsed as described further herein below. In certain embodiments, the process fluid reservoir 112 is provided pre-filled with process fluid and thus, the inlet 114 is not provided.

In certain embodiments, a movable member 120 is positioned in the rigid vessel 110, such that movement of the movable member 120 in a first direction (to the left as shown in FIG. 1) causes process fluid 122 (for example, slurry for use in a CMP process) to be drawn into the inlet 114 via a supply tube 123. Movement of the movable member 120 in a second direction (to the right as shown in FIG. 1) collapses the reservoir 112 and causes the process fluid to be expelled from the outlet 116 to a process tool 124 via a process tube 125. An actuator 130 selectively controls movement of the movable member 120.

Inlet and outlet check valves 115, 117 are provided at the inlet 114 and the outlet 116. When the movable member 120 is moved to the left as shown in FIG. 1, the outlet check valve 117 closes and the inlet check valve 115 opens, allowing the process fluid 122 to enter the process fluid reservoir 112. The supply pressure may be ambient (for example, if the process fluid 122 is supplied from a bottle), positive (loop pressure) or negative (for example, the process fluid 122 is supplied from a bucket). The process fluid loading is independent of variation in mean pressure or pressure pulsation in the process fluid supply. Because the pump system 100 is volumetric in nature, air bubbles are not differentiated from fluid.

Air collection and purge can be accomplished by several methods. For example, the use of an accumulator, or holding tank, prior to the inlet valve to store fluid and allow the air bubbles to rise to the top, while the process fluid sinks to the bottom. The bubble-less process fluid is then drawn into the inlet 114 from the bottom of the tank. In other implementations, an intelligent purge is used to release air bubbles some predetermined volume of process fluid is drawn into the reservoir 112 and another predetermined volume is purged off the top (possibly back into the supply tank). The remaining process fluid is then dispensed.

When the movable member 120 is moved to the right as shown in FIG. 1 to deliver process fluid to the process tool 124, the inlet check valve 115 closes and the outlet check valve 117 opens. This effectively isolates the pump system 100 from the supply of process fluid 122 during the delivery thereof. Thus, any upstream influences from pressure variation or plugging filters will not affect the process fluid flow rate during delivery. Generally, the actuator 130 can overcome any downstream influences (up to it's design limits) to maintain a commanded flow rate.

Figure 2:
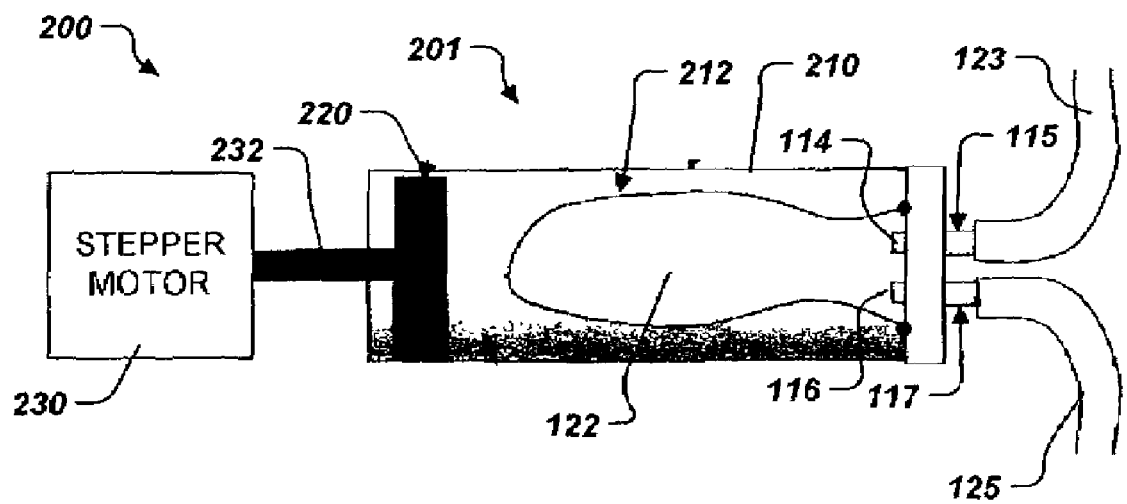
FIG. 2 generally illustrates a flow control system in accordance with an exemplary embodiment of the present invention.

FIG. 2 generally illustrates a flow control system 200 in accordance with exemplary embodiments of the invention. The flow control system 200 includes a syringe pump 201. In the pump system 200, the rigid vessel is a cylinder 210 having a generally uniform cross-section. The cylinder 210 has one end that includes the inlet 114 and the outlet 116, which are connected to the supply tube 123 and the process tube 125 via the inlet and outlet check valves 115, 117, respectively. A plunger 220 is situated generally opposite the inlet/outlet end of the cylinder 210. The plunger 220 is slidable in the cylinder 210 such that movement of the plunger 220 to the right as illustrated in FIG. 2 results in process fluid being expelled from the cylinder 210, through the outlet 116 to the process tube 125. As noted above, the cylinder 210 has a generally uniform cross section, so the volumetric flow rate is directly proportional to the plunger velocity.

In exemplary embodiments, a linear drive stepper motor 230 is connected to the plunger 220 via a piston 232 to actuate the plunger 220. The stepper motor 230 moves the plunger 220 at a commanded rate (for example, pulses per unit time), even if the downstream pressure changes. A Hybrid Linear Actuator, Size 23 Captive 57000 Series available from Haydon Switch and Instrument Company, for example, is a suitable stepper motor for actuating the plunger 220. The pump system 200 can respond to influences in the process essentially instantaneously, as the plunger force adjusts to the level required to keep the plunger 220 moving at the commanded rate.

In certain implementations, the motor current is monitored and used as an indication of problems in the process, such as downstream filter plugging. If the current becomes excessive, the system is shut down before mechanical failure occurs. The particular actuator used is based on several factors, including batch size, batch time, inlet pressure, outlet pressure, fluid viscosity, fluid density, etc.

A bladder 212 is situated in the cylinder 210 such that it is in fluid communication with the inlet 114 and the outlet 116 to form the process fluid reservoir 112. In the illustrated embodiment, the bladder 212 is fastened to the inlet/outlet end of the cylinder 210 such that the process fluid, such as slurry, is isolated from the interior of the cylinder 210 and the plunger 220. Thus, movement of the plunger in a one direction (to the left as shown in FIG. 2) causes fluid to be drawn into the bladder 212 and movement of the plunger in the opposite direction (to the right as shown in FIG. 2) causes fluid to be expelled from the bladder 212. The fluid supply tube 123 is connected to the inlet 114 via an inlet check valve 244, and the outlet 116 is connected to the process tube 125 via an outlet check valve 246.

Many applications, such as those associated with many semiconductor processes, require the flow path (all surfaces wetted by the process fluid) of fluid delivery systems be constructed of high purity, chemically inert/resistant, materials. In the slurry applications, such as CMP, abrasive particles could build up in the tubing forming a hard stone of abrasive material. If this stone then broke free from the tube and went on the wafer, the wafer would be scratched and could possibly be destroyed. Thus, filters are typically used to remove large particles.

Wetted components of the pump system 200, such as the bladder 212, the inlet 114, the outlet 116, the check valves 244, 246 and the supply and process tubes 123, 125 are fabricated of high-purity plastic. A suitable high purity plastic is PFA (perfluoroalkoxy copolymer), which is an advanced fluoropolymer with superior chemical resistance and mechanical properties. A variety of fluorinated polymers such PVDF and PTFE are also suitable. Moreover, these materials are non-stick and thus, do not tend to gather particles. The prevents particle build up and clogging of filters due to such build up.

Figure 3:
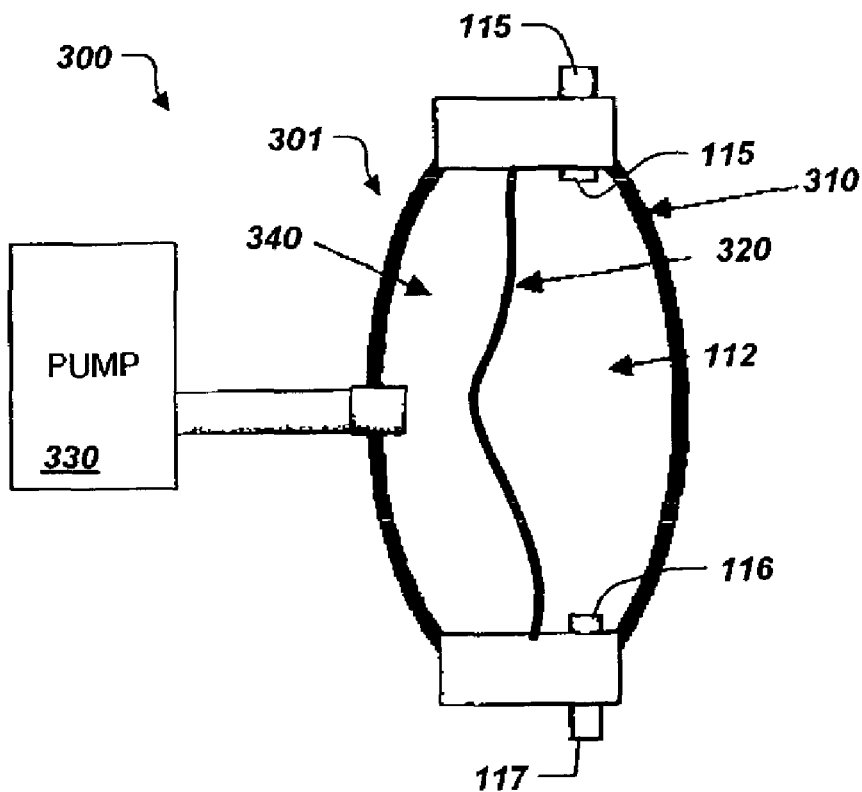
FIG. 3 generally illustrates a flow control system in accordance with another exemplary embodiment of the present invention.

FIG. 3 illustrates another exemplary flow control system 300 in accordance with embodiments of the present invention. The system 300 employs a diaphragm pump 301 and uses a pump 330 as an actuator. A diaphragm 320 is situated inside a rigid shell 310 to define the process fluid reservoir 112, which is in fluid communication with the inlet 114 and the outlet 116 and the inlet and outlet check valves 115, 117. In high purity applications, the wetted components are fabricated from a high purity plastic, such as PFA.

A working fluid reservoir 340 is defined on the opposite side of the diaphragm 320. The pump 330, such as a positive displacement pump, selectively meters working fluid into and out of the working fluid reservoir 340. Generally, an incompressible fluid, such as water or oil, is desirable for the working fluid. Thus, metering working fluid out of the working fluid reservoir 340 displaces the diaphragm 320 in a first direction (to the right as shown in FIG. 3) to draw process fluid into the inlet 114. Metering working fluid into the working fluid reservoir 340 displaces the diaphragm 320 in the opposite direction to expel process fluid from the outlet 116.

Figure 4:
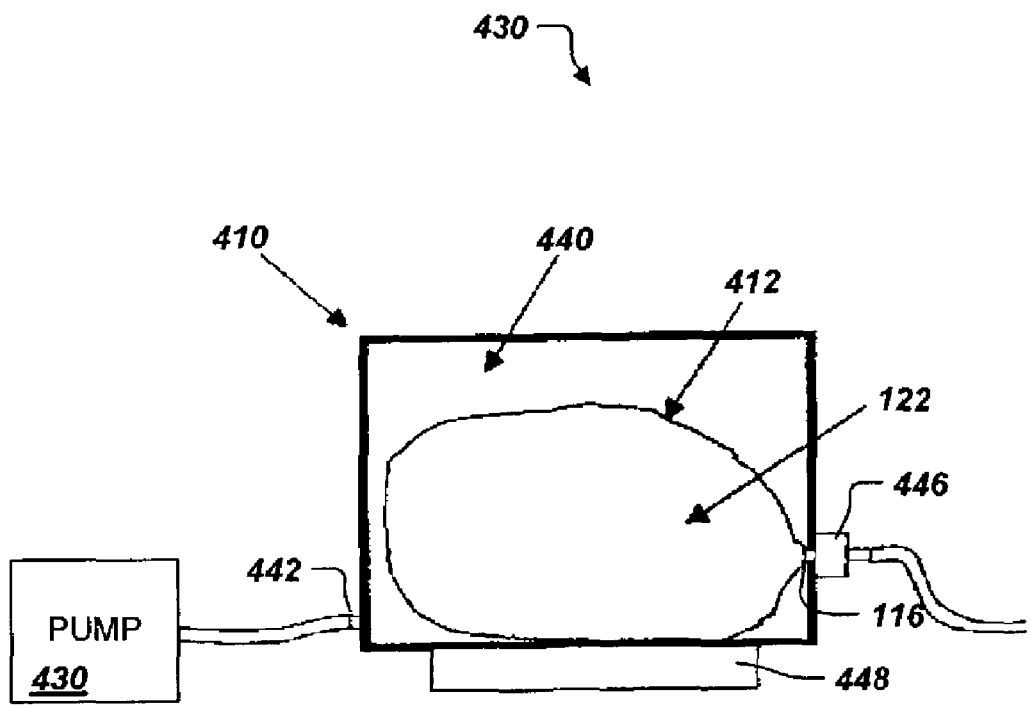
FIG. 4 generally illustrates a flow control system in accordance with a further exemplary embodiment of the present invention.

FIG. 4 illustrates a fluid control system 400 in accordance with further exemplary embodiments of the present invention. The system 400 includes a substantially rigid vessel 410 that defines a process fluid outlet 116 therethrough. A flexible process fluid reservoir 412 is received within the rigid vessel 410 and is in fluid communication with the process fluid outlet 116. Rather than using a movable member to collapse the process fluid reservoir 412, a working fluid is pumped into the rigid vessel 410 to collapse the process fluid reservoir. A working fluid reservoir 440 is defined in the rigid vessel 410 that substantially surrounds the process fluid reservoir 412. The rigid vessel 410 also defines a working fluid inlet 442. Working fluid received into the working fluid reservoir 440 compresses the process fluid reservoir 412 to expel process fluid 122 therefrom through the process fluid outlet 116. A pump 430, such as a metering pump or a syringe pump, is connected to the working fluid inlet 442 to metering working fluid into the working fluid reservoir 440. The process fluid 122 is thus expelled from the process fluid reservoir 412 at substantially the same rate as the working fluid entering the working fluid reservoir 440.

In certain embodiments, the process fluid reservoir 412 is a disposable bag, which in high purity applications, is fabricated from a high purity plastic such as PFA. The bag may be preloaded with the process fluid, such as slurry, and be air tight to insure no air bubbles are present when the process fluid is provided to the process. Further, the bag may be disposable, insuring a clean system and fresh process fluid. The use of a disposable bag drastically reduces the number of surfaces that are contacted by the process fluid between the time the process fluid is manufactured and the time it is introduced to the process tool.

The process fluid outlet 116 may have a filter 446 associated therewith. In systems using a disposable process fluid reservoir, the filter 446 may be integral with the process fluid bag so that the filter is automatically changed with each new supply of process fluid. Some implementations employ a mixer 448, such as an ultrasonic mixer, to agitate the process fluid through the process fluid reservoir 412.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A flow control system, comprising:
   a substantially rigid vessel having first and second ends;
   the first end of the rigid vessel having a slurry outlet connected to a CMP tool;
   a disposable bag preloaded with slurry situated in the rigid vessel in fluid communication with the slurry outlet;
   a working fluid reservoir situated in the rigid vessel and substantially surrounding the disposable bag, the rigid vessel defining a working fluid inlet such that working fluid received into the working fluid reservoir collapses the disposable bag to expel slurry through the slurry outlet at a desired flow rate.

2. The flow control system of claim 1, wherein the rigid vessel comprises a cylinder.

3. The flow control system of claim 1, wherein the slurry outlet includes an outlet check valve.

4. The flow control system of claim 1, wherein the disposable bag is fabricated from PFA.

5. The flow control system of claim 1, further comprising a pump connected to the working fluid inlet for metering working fluid into the working fluid reservoir.

6. A method of controlling the flow of slurry to a CMP tool, comprising:
   providing a disposable bag preloaded with slurry;
   situating the disposable bag in fluid communication with a slurry outlet;
   connecting the CMP tool to the slurry outlet; and
   collapsing the disposable bag to expel slurry from the disposable bag to the CMP tool at a desired flow rate.

7. The method of claim 6, wherein the disposable bag and a movable member are situated in a rigid vessel, and wherein collapsing the disposable bag comprises moving the movable member in a first direction.

8. The method of claim 6, wherein the disposable bag is situated in a rigid vessel, and wherein collapsing the disposable bag comprises pumping a working fluid into the rigid vessel.

* * * * *